United States Patent
Ohno et al.

(10) Patent No.: US 7,731,774 B2
(45) Date of Patent: Jun. 8, 2010

(54) HONEYCOMB STRUCTURED BODY

(75) Inventors: Kazushige Ohno, Gifu (JP); Hiroki Sato, Gifu (JP); Masayuki Hayashi, Gifu (JP); Kazutake Ogyu, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 11/496,431

(22) Filed: Aug. 1, 2006

(65) Prior Publication Data
US 2007/0028575 A1 Feb. 8, 2007

Related U.S. Application Data

(63) Continuation of application No. PCT/JP2005/017868, filed on Sep. 28, 2005.

(30) Foreign Application Priority Data
Sep. 30, 2004 (JP) .............................. 2004-287712

(51) Int. Cl.
*B01D 46/20* (2006.01)
*B01D 39/20* (2006.01)
*F01N 3/022* (2006.01)

(52) U.S. Cl. ..................... 55/523; 55/282.3; 55/385.3; 55/482; 55/484; 55/524; 55/DIG. 5; 55/DIG. 10; 55/DIG. 30; 95/273; 95/285; 95/286; 60/297; 60/299; 60/300; 60/303; 60/311; 502/439

(58) Field of Classification Search ............... 55/282.2, 55/282.3, 385.3, 482, 484, 523, 524, DIG. 5, 55/DIG. 10, DIG. 30; 60/295, 297, 299, 60/300, 303, 311; 502/439; 95/273, 285, 95/286

See application file for complete search history.

(56) References Cited

U.S. PATENT DOCUMENTS 5,914,187 A * 6/1999 Naruse et al. ................. 55/523

(Continued)

FOREIGN PATENT DOCUMENTS

EP 1 293 241 3/2003

(Continued)

OTHER PUBLICATIONS

U.S. Appl. No. 10/129,126.

(Continued)

*Primary Examiner*—Jason M Greene
(74) *Attorney, Agent, or Firm*—Finnegan, Henderson, Farabow, Garrett & Dunner, L.L.P.

(57) ABSTRACT

A honeycomb structured body of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein, supposing that the rate of the pore volume of pores having a pore diameter of 10 μm or less to the entire pore volume of the porous ceramic member is $X_1$ (%), the porosity is $Y_1$ (%) and the weight of the catalyst supporting layer is $Z_1$ (g/l), these $X_1$, $Y_1$ and $Z_1$ are allowed to satisfy the following expressions (1) and (2):

$$X_1 \leq 20 - Z_1/10 \quad (1), \text{ and}$$

$$Y_1 \geq 35 + 7Z_1/40 \quad (2)$$

(where about $20 \leq Z_1 \leq$ about 150).

8 Claims, 5 Drawing Sheets

U.S. PATENT DOCUMENTS

| | | |
|---|---|---|
| 5,930,994 A | 8/1999 | Shimato et al. |
| 6,447,564 B1 | 9/2002 | Ohno et al. |
| 6,565,630 B2 | 5/2003 | Ohno et al. |
| 6,669,751 B1 | 12/2003 | Ohno et al. |
| 6,770,116 B2 | 8/2004 | Kojima |
| 6,773,481 B2 * | 8/2004 | Noguchi et al. .............. 55/523 |
| 7,341,614 B2 | 3/2008 | Hayashi et al. |
| 7,427,309 B2 | 9/2008 | Ohno et al. |
| 7,438,967 B2 | 10/2008 | Fujita |
| 7,462,216 B2 | 12/2008 | Kunieda et al. |
| 7,473,465 B2 | 1/2009 | Ohno et al. |
| 2003/0039598 A1 | 2/2003 | Nishimura et al. |
| 2003/0093982 A1 * | 5/2003 | Suwabe et al. .............. 55/523 |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0161596 A1 * | 8/2004 | Taoka et al. ............. 428/304.4 |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0019061 A1 | 1/2005 | Karakama et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0154021 A1 | 7/2005 | Dutta |
| 2005/0159310 A1 | 7/2005 | Ohno et al. |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2005/0272602 A1 | 12/2005 | Ninomiya |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0037297 A1 | 2/2006 | Hijikata |
| 2006/0043562 A1 | 3/2006 | Watanabe |
| 2006/0051556 A1 | 3/2006 | Ohno et al. |
| 2006/0059877 A1 | 3/2006 | Yoshida |
| 2006/0068159 A1 | 3/2006 | Komori et al. |
| 2006/0073970 A1 | 4/2006 | Yamada |
| 2006/0093784 A1 | 5/2006 | Komori et al. |
| 2006/0108347 A1 | 5/2006 | Koyama et al. |
| 2006/0118546 A1 | 6/2006 | Saijo |
| 2006/0159602 A1 | 7/2006 | Ohno et al. |
| 2006/0166820 A1 | 7/2006 | Ogyu et al. |
| 2006/0172113 A1 | 8/2006 | Kunieda |
| 2006/0188415 A1 | 8/2006 | Ohno et al. |
| 2006/0194018 A1 | 8/2006 | Ohno et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0217262 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237428 A1 | 10/2008 | Kobayashi et al. |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |

FOREIGN PATENT DOCUMENTS

| | | |
|---|---|---|
| EP | 1 338 322 | 8/2003 |
| EP | 1 338 322 A1 * | 8/2003 |
| EP | 1 342 494 | 9/2003 |
| EP | 1 403 231 | 3/2004 |
| EP | 1 570 892 | 9/2005 |
| EP | 1 716 903 | 11/2006 |
| JP | 9-158710 | 6/1997 |
| JP | 9-220423 | 8/1997 |
| JP | 9-276708 | 10/1997 |
| JP | 2002-219319 | 8/2002 |
| JP | 2002-336656 | 11/2002 |
| JP | 2002-357114 | 12/2002 |
| JP | 2004-085013 | 2/2004 |
| JP | 2004-188303 | 7/2004 |
| WO | WO 02/26351 | 4/2002 |

| | | | |
|---|---|---|---|
| WO | WO 02/096827 | 12/2002 | |

U.S. Appl. No. 11/518,998.
U.S. Appl. No. 11/600,784.
U.S. Appl. No. 11/600,775.

OTHER PUBLICATIONS

U.S. Appl. No. 10/518,548.
U.S. Appl. No. 11/174,483.
U.S. Appl. No. 11/225,197.
Related case list .
U.S. Appl. No. 11/476,929.
U.S. Appl. No. 11/513,149.

International Preliminary Report on Patentability (PCT/JP2005/017868), 2007.
U.S. Appl. No. 11/711,021.
U.S. Appl. No. 11/951,949.

* cited by examiner

A-A line cross-section view

B-B line cross-section view

HONEYCOMB STRUCTURED BODY

CROSS REFERENCE TO RELATED APPLICATIONS

This application is a continuation application of PCT/JP2005/017868 filed on Sep. 28, 2005, which claims priority of Japanese Patent Application No. 2004-287712 filed on Sep. 30, 2004. The contents of these applications are incorporated herein by reference in their entirety.

BACKGROUND OF THE INVENTION

1. Field of the Invention

The present invention relates to a honeycomb structured body.

2. Discussion of the Background

In recent years, particulates such as soot and the like contained in exhaust gases discharged from internal combustion engines of vehicles, such as buses and trucks, and construction machines, have raised serious problems as those particulates are harmful to the environment and the human body.

There have been proposed various honeycomb structured bodies made from porous ceramics, which serve as filters capable of capturing particulates in exhaust gases to purify the exhaust gases.

Conventionally, with respect to the honeycomb structured body of this type, JP-A 2002-219319 has disclosed a filter made from porous cordierite, in which a number of through holes, each having either one of ends being sealed, extend in a longitudinal direction with a partition wall interposed therebetween so that a number of cells are formed, and this filter (porous cordierite) has a pore distribution of the following ratio: pore volume of pores having a pore diameter of less than 10 μm: 15% or less of the entire pore volume, pore volume of pores having a pore diameter in a range of 10 to 50 μm: 75% or more of the entire pore volume, and pore volume of pores having a pore diameter exceeding 50 μm: 10% or less of the entire pore volume.

JP-A 2002-219319 describes that, as the effects of the filter, the particulate capture efficiency is improved and it is possible to prevent the increase in pressure loss due to clogging of the pores with the particulates.

JP-A 2002-357114 discloses an exhaust gas purifying filter having the same structure as that of JP-A 2002-219319, in which a catalyst used for oxidizing and removing particulates is adhered to a partition wall, the porosity is set in a range of 55 to 80%, the average pore diameter is set in a range of 30 to 50 μm and the pore volume of pores having a pore diameter of 100 μm or more is set to 5% or less of the entire pore volume.

The contents of JP-A 2002-219319, JP-A 2002-357114 are incorporated herein by reference in their entirety.

SUMMARY OF THE INVENTION

A honeycomb structured body in accordance with a first aspect of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein, supposing that the rate of the pore volume of pores having a pore diameter of 10 μm or less to the entire pore volume of the porous ceramic member is $X_1$ (%), the porosity is $Y_1$ (%) and the weight of the catalyst supporting layer is $Z_1$ (g/l), these $X_1$, $Y_1$ and $Z_1$ are allowed to satisfy the following expressions (1) and (2):

$$X_1 \leq 20 - Z_1/10 \quad (1), \text{ and}$$

$$Y_1 \geq 35 + 7Z_1/40 \quad (2)$$

(where about $20 \leq Z_1 \leq $ about 150).

Here, the weight $Z_1$ of the catalyst supporting layer represents a weight (g) per 1 liter of the apparent volume of the honeycomb structured body.

The porosity of the porous ceramic member is desirably set to at least about 38.5% and at most about 75%, and more desirably set in the range of about 40% to about 65%. The average pore diameter of the honeycomb structured body is desirably set to at least about 10 μm and at most about 50 μm.

Desirably, the catalyst supporting layer comprises alumina, titania, zirconia, silica or ceria.

Desirably, a catalyst comprising platinum, palladium, rhodium, an alkali metal, an alkali earth metal, a rare-earth element or a transition metal element is supported on the catalyst supporting layer.

A honeycomb structured body in accordance with a second aspect of the present invention is a honeycomb structured body comprising a porous ceramic having a plurality of cells which are allowed to penetrate in a longitudinal direction with a wall portion therebetween and either one end of which is sealed, with a catalyst supporting layer being adhered to the wall portion, wherein, supposing that the rate of the pore volume of pores having a pore diameter of 10 μm or less to the entire pore volume of the porous ceramic is $X_2$ (%), the porosity is $Y_2$ (%) and the weight of the catalyst supporting layer is $Z_2$ (g/l), these $X_2$, $Y_2$ and $Z_2$ are allowed to satisfy the following expressions (3) and (4):

$$X_2 \leq 20 - Z_2/10 \quad (3), \text{ and}$$

$$Y_2 \geq 35 + 7Z_2/40 \quad (4)$$

(where about $20 \leq Z_2 \leq $ about 150).

Here, the weight $Z_2$ of the catalyst supporting layer represents a weight (g) per 1 liter of the apparent volume of the honeycomb structured body.

The porosity of the porous ceramic is desirably set to at least about 38.5% and at most about 75%, and more desirably set in the range of about 40% to about 65%.

The average pore diameter of the honeycomb structured body is desirably set to at least about 10 μm and at most about 50 μm.

Desirably, the catalyst supporting layer comprises alumina, titania, zirconia, silica or ceria.

Desirably, a catalyst comprising platinum, palladium, rhodium, an alkali metal, an alkali earth metal, a rare-earth element or a transition metal element is supported on the catalyst supporting layer.

The honeycomb structured body in accordance with the first aspect of the present invention desirably comprises silicon carbide-based ceramics or a composite body of silicon and silicon carbide, and the honeycomb structured body in accordance with the second aspect of the present invention desirably comprises cordierite or aluminum titanate.

The honeycomb structured body of the first aspect of the present invention, and the honeycomb structured body of the second aspect of the present invention are desirably used as an exhaust gas purifying device for vehicles.

In the following description, a honeycomb structured body having a structure in which a plurality of porous ceramic members are combined with one another through an adhesive layer, such as the honeycomb structured body in accordance with the first aspect of the present invention, is referred to as an aggregated honeycomb structured body. In contrast, a honeycomb structured body having an integral form as a whole, such as the honeycomb structured body in accordance with the second aspect of the present invention, is referred to as an integral honeycomb structured body. Moreover, in the case where it is not necessary to specifically distinguish the integral honeycomb structured body from the aggregated honeycomb structured body, this is simply referred to as "honeycomb structured body".

DESCRIPTION OF THE EMBODIMENTS

Figure 1:
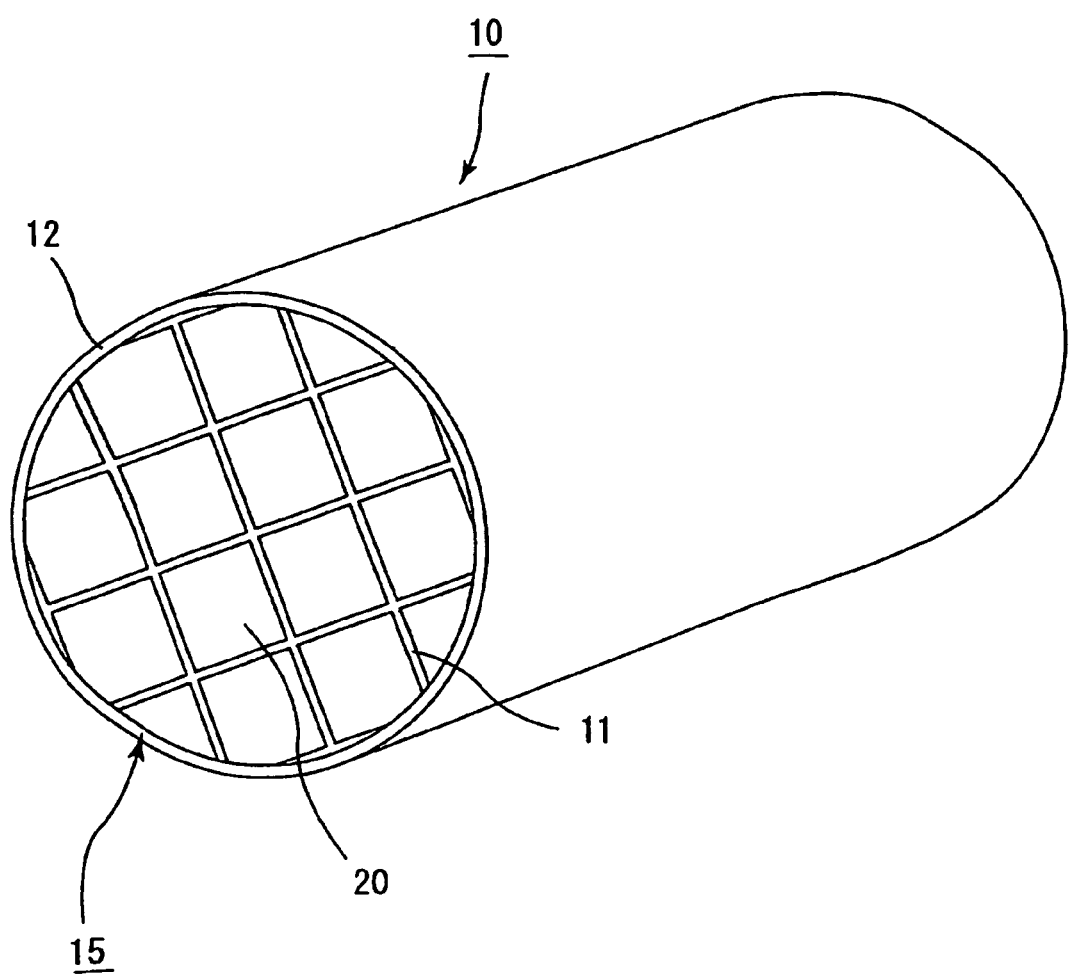
FIG. 1 is a perspective view that schematically shows a honeycomb structured body according to one embodiment of the first aspect of the present invention.

The honeycomb structured body according to embodiments of the first aspect of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein, supposing that the rate of the pore volume of pores having a pore diameter of 10 μm or less to the entire pore volume of the porous ceramic member is $X_1$ (%), the porosity is $Y_1$ (%) and the weight of the catalyst supporting layer is $Z_1$ (g/l), these $X_1$, $Y_1$ and $Z_1$ are allowed to satisfy the following expressions (1) and (2):

$$X_1 \leq 20 - Z_1/10 \quad (1), \text{ and}$$

$$Y_1 \geq 35 + 7Z_1/40 \quad (2)$$

(where about $20 \leq Z_1 \leq$ about 150).

Figure 2A:
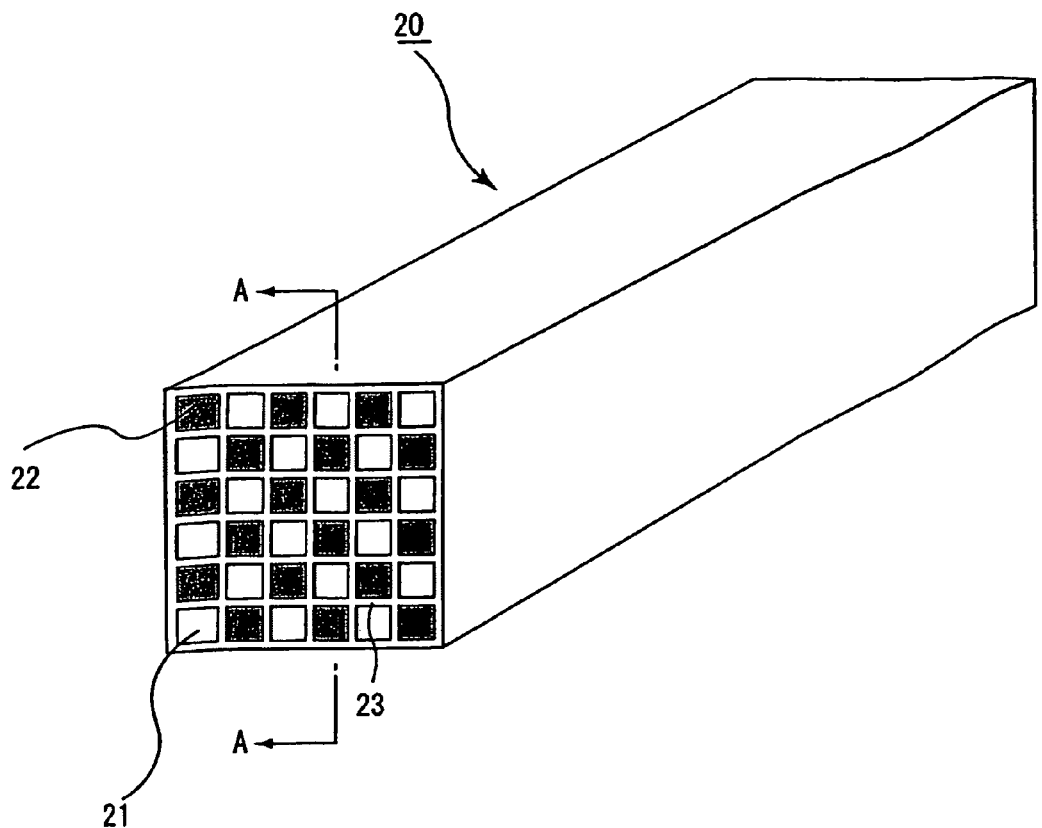
FIG. 2A is a perspective view that schematically shows porous ceramic members that form a honeycomb structured body according to one embodiment of the first aspect of the present invention.
Figure 2B:
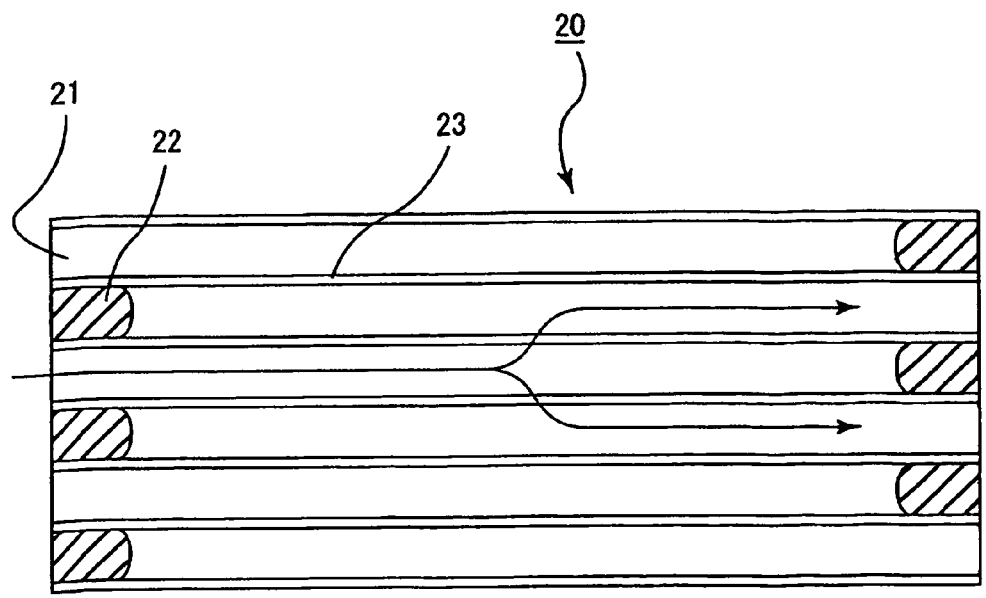
FIG. 2B is a cross-sectional view taken along line B-B thereof.

FIG. 1 is a perspective view that schematically shows the honeycomb structured body according to one embodiment of the first aspect of the present invention, FIG. 2A is a perspective view showing a porous ceramic member that constitutes one embodiment of the honeycomb structured body shown in FIG. 1, and FIG. 2B is a cross-sectional view taken along line A-A of the porous ceramic member shown in FIG. 2A.

As shown in FIG. 1, the honeycomb structured body according to one embodiment of the first aspect of the present invention is an aggregated-type honeycomb structured body 10 in which a plurality of porous ceramic members 20 made from silicon carbide or the like are combined with each other through adhesive layers 11 to form a cylindrical ceramic block 15, and a sealing material layer (coat layer) 12 is formed on the periphery of this ceramic block 15.

In the honeycomb structured body 10, shown in FIG. 1, according to one embodiment of the first aspect of the present invention, the shape of the ceramic block is a cylindrical shape; however, the ceramic block of the present invention is not limited to the cylindrical shape as long as it has a pillar shape, and any desired shape, such as an cylindroid shape and a rectangular pillar shape, may be used.

As shown in FIG. 2A and FIG. 2B, the porous ceramic member 20 has a number of cells 21 placed in parallel with one another in the longitudinal direction so that cell walls (wall portions) 23 that separate the cells 21 are allowed to function as filters. In other words, each of the cells 21 formed in the porous ceramic member 20 has either one of the ends on the inlet side or the outlet side for exhaust gases sealed with a plug 22 as shown in FIG. 2B so that exhaust gases that have flowed into one of the cells 21 are allowed to flow out of another cell 21 after surely having passed through a cell wall 23 that separates the cells 21.

The honeycomb structured body according to the embodiments of the first aspect of the present invention is mainly made of porous ceramics, and with respect to the material, examples thereof include: nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite and silica. Here, the honeycomb structured body 10 may be formed by using materials of two or more kinds, such as a composite body of silicon and silicon carbide, and aluminum titanate. In the case where the composite body of silicon and silicon carbide is used, silicon is desirably added to make up at least about 0% by weight and at most about 45% by weight of the entire body.

With respect to the porous ceramic material, a silicon carbide-based ceramic material, which has a high heat resistance, is superior in mechanical characteristics and has a high thermal conductivity, is desirably used. Here, the silicon carbide-based ceramic material refers to a material having a silicon carbide content of about 60% by weight or more.

The honeycomb structured body 10 according to one embodiment of the first aspect of the present invention is a honeycomb structured body with a catalyst supporting layer adhered thereto, and a catalyst is supported on the catalyst supporting layer.

With respect to the catalyst, although not particularly limited, those which can reduce the activation energy for burning particulates so that the particulates are readily burned, or those which can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metals, an element, such as an alkali metal (Group 1 in Element Periodic Table), an alkali earth metal (Group 2 in Element Periodic Table), a rare-earth element (Group 3 in Element Periodic Table) and a transition metal element may be supported thereon.

By adhering a catalyst supporting layer to the honeycomb structured body 10, and supporting a catalyst on the catalyst supporting layer, it may become possible for the honeycomb structured body 10 to function as a filter capable of capturing particulates in exhaust gases, and also function as a catalyst converter for converting CO, HC, NOx and the like contained in exhaust gases.

Moreover, when the catalyst is adhered to the catalyst supporting layer of the honeycomb structured body 10, it is desirable to apply the catalyst after the surface of the honeycomb structured body 10 is coated with a catalyst supporting layer such as alumina. With this arrangement, the specific surface area is likely to be made greater so that the degree of dispersion of the catalyst is improved, and thus it may become easier to increase the reaction sites of the catalyst. Moreover, since the catalyst supporting layer may be able to easily prevent the catalyst metal from sintering, the heat resistance of the catalyst is also likely to improve.

With respect to the catalyst supporting layer, oxide ceramics such as alumina, titania, zirconia, silica and ceria can be used.

In the embodiments according to the first aspect of the present invention, supposing that the rate of the pore volume of pores having a pore diameter of 10 μm or less to the entire pore volume of the porous ceramic member is $X_1$ (%), the porosity is $Y_1$ (%) and the weight of the catalyst supporting layer is $Z_1$ (g/l), these $X_1$, $Y_1$ and $Z_1$ are allowed to satisfy the following expressions (1) and (2):

$$X_1 \leq 20 - Z_1/10 \qquad (1), \text{ and}$$

$$Y_1 \geq 35 + 7Z_1/40 \qquad (2)$$

(where about $20 \leq Z_1 \leq$ about 150).

By adjusting the pore diameter and porosity of the porous ceramic member in accordance with the amount of the catalyst supporting layer so as to satisfy the above-mentioned expressions (1) and (2), it becomes easier to sufficiently exert functions such as a purifying (converting) function for exhaust gases, and also prevent an increase in the pressure loss.

In the case where $X_1$ is $(20-Z_1/10)$ or less, since the rate of the pore volume of pores having a pore diameter of 10 μm or less to the entire pore volume of the wall portion constituting the porous ceramic member 20 becomes less likely to be greater in comparison with the amount of adhesion of the catalyst supporting layer, the catalyst supporting layer becomes less likely to adhere to the pores, thus the pressure loss tends not to increase.

In this specification, the cell wall refers to a portion that separates cells, and the wall portion refers to the entire porous ceramic member 20 including the cell wall.

Moreover, in the case where $Y_1$ is $(35+7Z_1/40)$ or more, since the volume of the pore itself becomes less likely to be small in comparison with the amount of adhesion of the catalyst supporting layer, the catalyst supporting layer becomes less likely to adhere to the pores and the volume of pores becomes less likely to decrease, and thus pressure loss tends not to increase.

Although not particularly limited, the lower limit of the porosity $Y_1$ of the porous ceramic member 20 is desirably set to about 38.5%, and the upper limit thereof is desirably set to about 75%. When the porosity is about 38.5% or more, the honeycomb structured body 10 becomes less likely to cause clogging upon adhesion of the catalyst supporting layer thereto, and thus the pressure loss tends not to increase. In contrast, when the porosity is about 75% or less, the honeycomb structured body 10 tends not to have a reduction in its strength and tends not to be easily broken.

More desirably, the lower limit of the porosity $Y_1$ of the porous ceramic member 20 is set to about 40%, and the upper limit thereof is set to about 65%.

The amount ($Z_1$) of the catalyst supporting layer is set to at least about 20 g/l and at most about 150 g/l. By setting the amount of the catalyst supporting layer in this range, it becomes easier to favorably disperse the catalyst, and it becomes easier to prevent the increase in the pressure loss.

With respect to the average pore diameter of the honeycomb structured body 10, the lower limit value is desirably set to about 10 μm, and the upper limit value is desirably set to about 50 μm. The average pore diameter of about 10 μm or more tends not to cause high pressure loss after adhesion of the catalyst supporting layer. In contrast, the average pore diameter of about 50 μm or less tends not to allow particulates to easily pass through the pores. Therefore, the honeycomb structured body is likely to more easily capture particulates sufficiently and is allowed to more easily function as a filter without fail.

The above-mentioned porosity can be measured through known methods such as a mercury injection method, Archimedes method and a measuring method using a scanning electron microscope (SEM).

With respect to the particle diameter of the ceramic used upon manufacturing the honeycomb structured body 10, although not particularly limited, those which are less susceptible to shrinkage in the succeeding firing process are desirably used, and for example, those powders, prepared by combining 100 parts by weight of powders having an average particle diameter of at least about 0.3 μm and at most about 50 μm with at least about 5 parts by weight and at most about 65 parts by weight of powders having an average particle diameter of at least about 0.1 μm and at most about 1.0 μm, are desirably used.

By combining and mixing ceramic powders having the above-mentioned pore diameter, the porosity and the rate of pores having a pore diameter of about 10 μm or less can be more easily adjusted to a certain degree.

The plug 22 and the wall portion 23 that configure the porous ceramic member 20 are desirably made from the same porous ceramic material. With this arrangement, the contact strength between the two members can be more easily increased, and by adjusting the porosity of the plug 22 in the same manner as the wall portions 23, the coefficient of thermal expansion of the wall portions 23 and the coefficient of thermal expansion of the plug 22 can be more easily adjusted properly so that it becomes easier to prevent a gap generated between the plug 22 and the wall portions 23 due to a thermal stress upon production and in use and also to prevent cracks from occurring in the plug 22 and at portions of the wall portions 23 that are made contact with the plug 22. Here, the wall portion refers to both the cell wall separating the cells 21 and the peripheral portion.

With respect to the thickness of the plug 22, although not particularly limited, in the case where the plug 22 is made from porous silicon carbide, it is desirably set to at least about 1 mm and at most about 20 mm, more desirably in the range of about 3 mm to about 10 mm.

The thickness of the cell wall (wall portion) 23 is not particularly limited, and the lower limit value is desirably set to about 0.1 mm, while the upper limit value is desirably set to about 0.6 mm. With the thickness of about 0.1 mm or more, the strength of the honeycomb structured body 10 tends to be sufficient. The thickness of about 0.6 mm or more tends not to cause high pressure loss.

In the honeycomb structured body 10 of the present invention, the adhesive layer 11, which is formed between the porous ceramic members 20, functions as an adhesive (or a sealing material) used for binding a plurality of the porous ceramic members 20 to one another. In contrast, the sealing material layer 12, which is formed on the peripheral face of the honeycomb block 15, is also allowed to function as a sealing material used for preventing exhaust gases passing through the cells from leaking from the peripheral face of the honeycomb block 15 when the honeycomb structured body 10 is placed in an exhaust passage of an internal combustion engine, and as an reinforcing member used for adjusting the shape of the honeycomb block 15 as well as improving the strength thereof.

Here, in the honeycomb structured body 10, the adhesive layer 11 and the sealing material layer 12 may be formed by using the same material or different materials. In the case where the adhesive layer 11 and the sealing material layer 12 are made from the same material, the compounding ratio of materials thereof may be the same or may be different. Moreover, the material may have either a dense structure or a porous structure.

With respect to the material used for forming the adhesive layer 11 and the sealing material layer 12, although not particularly limited, for example, a material, made from inorganic fibers and/or inorganic particles in addition to an inorganic binder and an organic binder, may be used.

With respect to the above-mentioned inorganic binder, examples thereof include silica sol and alumina sol. Each of these materials may be used alone, or two or more kinds of these may be used in combination. Among the above-mentioned inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is more desirably used.

With respect to the inorganic fibers, examples thereof include ceramic fibers such as silica-alumina, mullite, alumina and silica. Each of these may be used alone, or two or more kinds of these may be used in combination. Among the above-mentioned inorganic fibers, silica-alumina fibers are more desirably used.

With respect to the inorganic particles, examples thereof include carbides, nitrides and the like, more specifically, inorganic powder containing silicon carbide, silicon nitride, boron nitride and the like. Each of these may be used alone, or two or more kinds of these may be used in combination. Among the above-mentioned in organic particles, silicon carbide, which is superior in thermal conductivity, is more desirably used.

Moreover, a pore-forming agent, such as balloons that are fine hollow spheres composed of oxide-based ceramics, spherical acrylic particles or graphite, may be added to the above-mentioned paste used for forming the sealing material layer and adhesive layer, if necessary.

With respect to the above-mentioned balloons, although not particularly limited, for example, alumina balloons, glass micro-balloons, shirasu balloons, fly ash balloons (FA balloons), mullite balloons and the like may be used. Among these, alumina balloons are more desirably used.

Here, the honeycomb structured body of the present invention with catalyst supported on the catalyst supporting layer is allowed to function as a gas purifying (converting) device in the same manner as conventionally known DPFs (Diesel Particulate Filters) with a catalyst. Therefore, with respect to the case where the integral honeycomb structured body of the present invention is used also as a catalyst supporting carrier, detailed description of the functions thereof is omitted.

With the honeycomb structured body according to the embodiments of the first aspect of the present invention, since the relationships among the amount of the catalyst supporting layer, the pore diameter and the porosity of the porous ceramic member are specified as described above, by supporting a catalyst on the catalyst supporting layer, the honeycomb structured body according to the embodiments of the first aspect of the present invention can more easily exert catalyst functions sufficiently, and it becomes easier to prevent the increase in pressure loss after the addition of the catalyst.

Next, the following description will discuss a manufacturing process of the honeycomb structured body according to the embodiments of the first aspect of the present invention.

First, an extrusion-molding process is carried out by using material paste mainly composed of the above-mentioned ceramic material so that a square-pillar shaped ceramic molded body is manufactured.

Although the material paste is not particularly limited, material paste which sets the porosity of the honeycomb structured body after the manufacturing to at least about 38.5% and at most about 75% is desirable, and, for example, a material paste prepared by adding a binder, a dispersant solution and the like to powder containing the above-mentioned ceramics may be used.

With respect to the particle diameter of the ceramic powder, although not particularly limited, those which are less susceptible to shrinkage in the succeeding firing process are desirably used, and for example, those powders, prepared by combining 100 parts by weight of powders having an average particle diameter of at least about 0.3 µm and at most about 50 µm with at least about 5 parts by weight and at most about 65 parts by weight of powders having an average particle diameter of at least about 0.1 µm and at most about 1.0 µm, are preferably used.

In order to adjust the pore diameter and the like of the porous ceramic member, the firing temperature needs to be adjusted; however, the pore diameter can be adjusted by adjusting the particle diameter of the ceramic powder.

With respect to the above-mentioned binder, although not particularly limited, examples thereof include: methyl cellulose, carboxymethyl cellulose, hydroxyethyl cellulose, polyethylene glycol and the like.

In general, the compounding amount of the above-mentioned binder is desirably set to at least about 1 part by weight and at most about 10 parts by weight with respect to 100 parts by weight of the ceramic powder.

With respect to the dispersant solution, although not particularly limited, examples thereof include: an organic solvent such as benzene; alcohol such as methanol; water, and the like.

An appropriate amount of the above-mentioned dispersant solution is mixed therein so that the viscosity of the material paste is set within a fixed range.

The ceramic powder, binder and dispersant solution are mixed by an attritor or the like, and sufficiently kneaded by a kneader or the like, and then extrusion-molded.

Moreover, a molding auxiliary may be added to the material paste, if necessary.

With respect to the molding auxiliary, although not particularly limited, examples thereof include ethylene glycol, dextrin, fatty acid soap, fatty acid, polyvinyl alcohol and the like.

Moreover, a pore-forming agent, such as balloons that are fine hollow spheres composed of oxide-based ceramics, spherical acrylic particles and graphite, may be added to the above-mentioned material paste, if necessary.

With respect to the above-mentioned balloons, although not particularly limited, examples thereof include alumina balloons, glass micro-balloons, shirasu balloons, fly ash balloons (FA balloons), mullite balloons and the like. Among these, alumina balloons are more desirably used.

Next, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug material paste, which forms plugs, is injected into the end portion on the outlet side of the inlet-side group of cells and the end portion on the inlet side of the outlet-side group of cells so that the cells are sealed.

With respect to the plug material paste, although not particularly limited, such paste that sets the porosity of a plug produced through the succeeding processes to at least about 30% and at most about 75% is desirably used, and for example, the same paste as the material paste may be used.

Next, the ceramic dried body filled with the plug material paste is subjected to degreasing (for example, at least about 200° C. and at most about 500° C.) and firing (for example, at least about 1400° C. and at most about 2300° C.) under predetermined conditions so that a porous ceramic member 20, made from porous ceramics and constituted by a single sintered body as a whole, is manufactured.

Next, in the honeycomb structured body according to one embodiment of the present invention, an adhesive paste to form the adhesive layer 11 is applied to each of the side faces of the porous ceramic member 20 with an even thickness to form an adhesive paste layer, and by repeating a process for successively laminating another porous ceramic member 20 on this adhesive paste layer, a porous ceramic member aggregated body having a predetermined size is manufactured.

With respect to the material for forming the adhesive paste, since it has been explained, the explanation thereof is omitted.

Next, the porous ceramic member aggregated body is heated so that the adhesive paste layer is dried and solidified to form the adhesive layer 11.

Moreover, the porous ceramic member aggregated body in which a plurality of the porous ceramic members 20 are bonded to one another through the adhesive layers 11 is subjected to a cutting process by using a diamond cutter and the like so that a ceramic block 15 having a cylindrical shape is manufactured.

By forming a sealing material layer 12 on the outer periphery of the honeycomb block 15 by using the sealing material paste, a honeycomb structured body 10 in which the sealing material layer 12 is formed on the peripheral portion of the cylindrical ceramic block 15 having a plurality of the porous ceramic members 20 bonded to one another through the adhesive layers 11 can be manufactured.

The present invention provides a structure in which a catalyst supporting layer is formed, and desirably, a catalyst such as a noble metal or the like is added to this catalyst supporting layer.

After the above process, the catalyst is supported, however the catalyst supporting process may be conducted before manufacturing the above-mentioned aggregated body.

With respect to the method for forming the catalyst supporting layer made from alumina on the surface of the ceramic fired body, for example, a method in which the ceramic fired body is impregnated with a solution containing alumina powder and heated may be proposed.

Thereafter, the ceramic fired body may be impregnated with a solution of a metal compound containing a rare-earth element such as $Ce(NO_3)_3$ or the like.

Here, upon preparing the alumina powder, a solution of a metal compound containing a rare-earth element such as $Ce(NO_3)_3$ or the like, and a solution of a metal compound containing aluminum such as $Al(NO_3)_3$ are mixed so that these elements are preliminarily allowed to stay in a mixed state, and the resulting powder containing alumina and ceria in a mixed state may be ground and supported.

With respect to the method for applying the catalyst to the alumina film, for example, a method in which a ceramic fired body is impregnated with, for example, a nitric acid solution of diamine dinitro platinum ($[Pt(NH_3)_2(NO_2)_2]HNO_3$) and then heated may be proposed.

The use of the honeycomb structured body according to the embodiments of the first aspect of the present invention is not particularly limited, and it is desirably used as an exhaust gas purifying device for vehicles. The same can be said for the honeycomb structured body according to embodiments of the second aspect of the present invention mentioned below.

Figure 3:
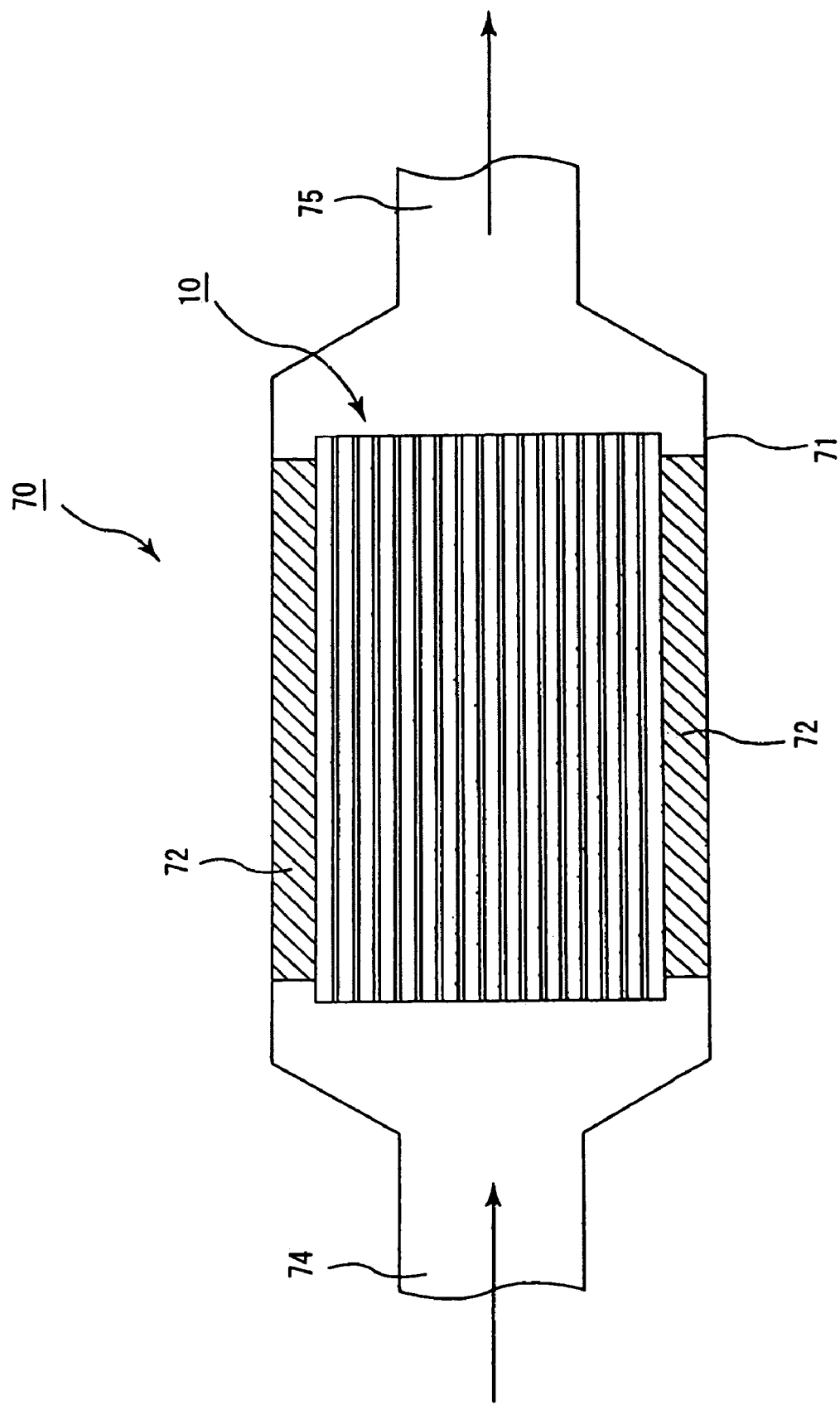
FIG. 3 is a cross-sectional view that schematically shows one example of an exhaust gas purifying device for a vehicle in which the honeycomb structured body of the present invention is installed.

FIG. 3 is a cross-sectional view that schematically shows one example of an exhaust gas purifying device for a vehicle in which the honeycomb structured body according to one embodiment of the present invention is installed.

As shown in FIG. 3, an exhaust gas purifying device 70 is mainly configured by a honeycomb structured body 10, a casing 71 that covers the outside of the honeycomb structured body 10, and a holding sealing material 72 placed between the honeycomb structured body 10 and the casing 71, and an introducing pipe 74 coupled to an internal combustion system such as an engine is connected to the end portion of the casing 71 on the side to which exhaust gases are introduced, with an exhaust pipe 75 coupled to the outside being connected to the other end portion of the casing 71. In FIG. 3, arrows indicate flows of exhaust gases.

In the exhaust gas purifying device 70 having the above-mentioned configuration, exhaust gases, discharged from an internal combustion system such as an engine, are introduced into the casing 71 through the introducing pipe 74, and allowed to flow into the honeycomb structured body from the inlet side cells and pass through a wall portion so that, after particulates therein have been captured by this wall portion to purify the exhaust gases, the resulting exhaust gases are discharged outside the honeycomb structured body from the outlet side cells through the exhaust pipe 75. Moreover, catalyst is adhered to the honeycomb structured body, and thereby it may become possible to convert toxic gas components such as CO, HC and NOx in exhaust gases.

In the exhaust gas purifying device 70, when a large amount of particulates are disposed on the wall portion of the honeycomb structured body and the pressure loss becomes high, a regeneration process of the honeycomb structured body is carried out.

In the regenerating process, particulates may be burned and removed using a post-injection method, or may be carried out by using reaction heat derived from a catalyst supporting layer and catalyst layer further formed in front of the honeycomb structured body. Moreover, the particulates disposed on the wall portion of the honeycomb structured body may be burned and removed through a method in which the honeycomb structured body is heated by allowing gases which are heated using a heating means, not shown, to flow into the cells of the honeycomb structured body.

In the honeycomb structured body according to one embodiment of the present invention to which a catalyst is adhered, particulates can be burned and removed at a temperature lower than the normally required temperature depending on the type and the like of the catalyst.

The following description will discuss the honeycomb structured body according to the embodiments of the second aspect of the present invention.

The honeycomb structured body according to the embodiments of the second aspect of the present invention comprises a porous ceramic having a plurality of cells which are allowed to penetrate in a longitudinal direction with a wall portion therebetween and either one end of which is sealed, with a catalyst supporting layer being adhered to the wall portion, wherein, supposing that the rate of the pore volume of pores having a pore diameter of 10 μm or less to the entire pore volume of the porous ceramic is $X_2$ (%), the porosity is $Y_2$ (%) and the weight of the catalyst supporting layer is $Z_2$ (g/l), these $X_2$, $Y_2$ and $Z_2$ are allowed to satisfy the following expressions (3) and (4):

$$X_2 \leq 20 - Z_2/10 \qquad (3), \text{ and}$$

$$Y_2 \geq 35 + 7Z_2/40 \qquad (4)$$

(where about $20 \leq Z_2 \leq$ about 150).

Figure 4A:
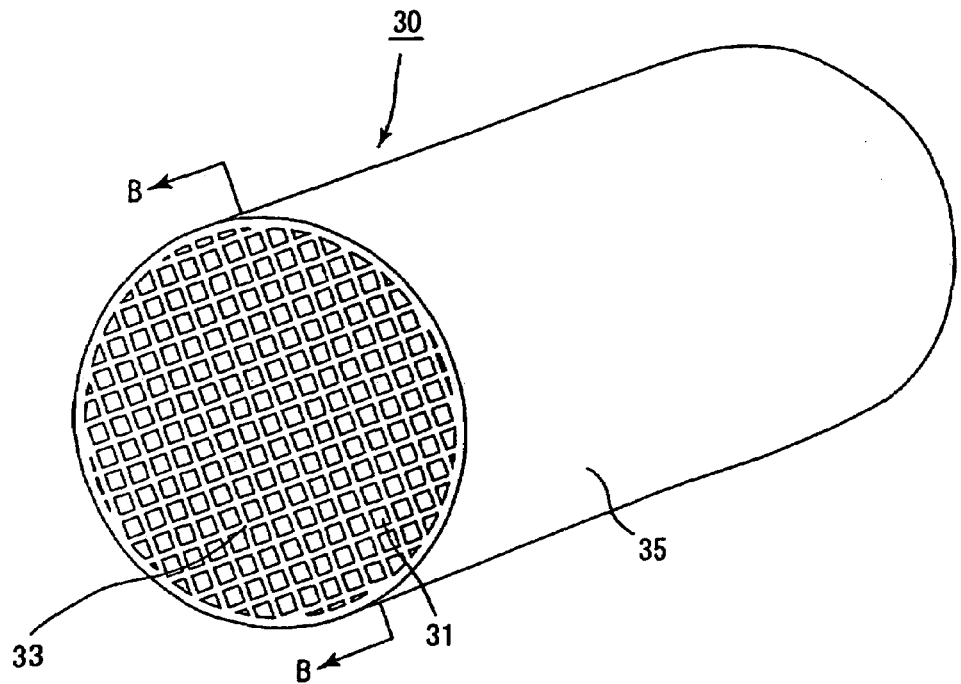
FIG. 4A is a cross-sectional view that schematically shows a honeycomb structured body according to one embodiment of the second aspect of the present invention.
Figure 4B:
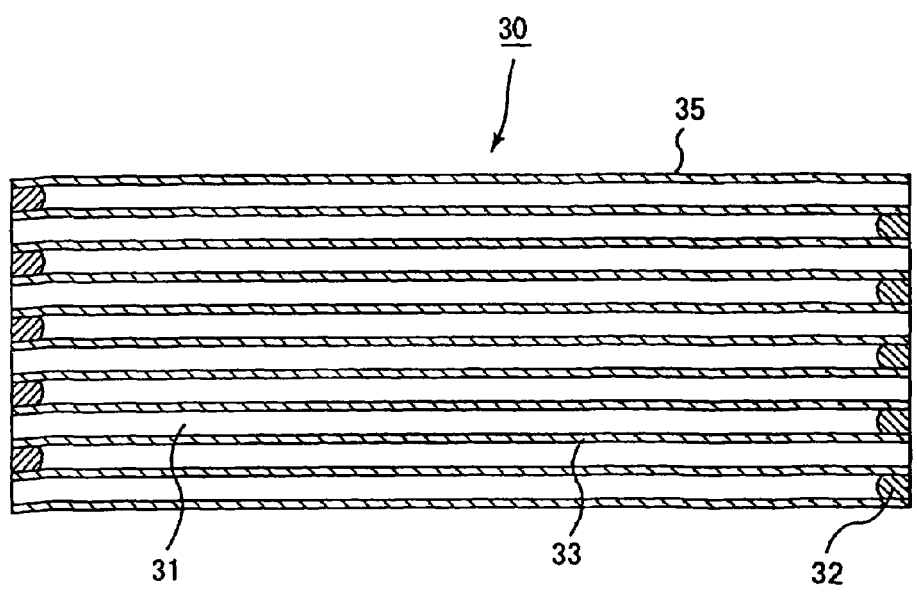
FIG. 4B is a cross-sectional view taken along line B-B thereof.

FIG. 4A is a perspective view that schematically shows a specific example of an integral honeycomb structured body which is the honeycomb structured body according to one embodiment of the second aspect of the present invention, and FIG. 4B is a cross-sectional view taken along line B-B of FIG. 4A.

As shown in FIG. 4A, the honeycomb structured body 30 according to one embodiment of the present invention is formed by a cylindrical ceramic block 35 comprising a porous ceramic in which a number of cells 31 are placed in parallel with one another in the longitudinal direction with a cell wall (wall portion) 33 therebetween. Here, the wall portion refers to both the cell wall that separates the cells 31, and the outer peripheral portion of the ceramic block.

As shown in FIG. 4B, in the honeycomb structured body 30 according to one embodiment of the second aspect of the present invention, the ceramic block 35 has a structure in which either one of the end portions of the cell 31 is sealed with a plug 32.

In other words, in the ceramic block 35 of the honeycomb structured body 30 according to one embodiment of the present invention, predetermined cells 31 are sealed with the plugs 32 at one of the end portions, and at the other end portion thereof, the cells 31 that have not been sealed with the plugs 32 are sealed with the plugs 32.

In this structure, exhaust gases that have flowed into one cell 31 are always allowed to flow out of another cell 31 after having passed through the cell wall 33 separating the cells 31 so that the wall portion 33 separating the cells 31 from each other is allowed to function as a particle capturing filter.

Although not shown in FIG. 4, in the same manner as the honeycomb structured body 10 shown in FIG. 1, a sealing material layer may be formed on the periphery of the ceramic block 35.

The porous ceramic material forming the honeycomb structured body is not particularly limited, and examples thereof include: oxide ceramics such as cordierite, alumina, silica, mullite, zirconia, and yttria; carbide ceramics such as silicon carbide, zirconium carbide, titanium carbide, tantalum carbide and tungsten carbide; nitride ceramics such as aluminum nitride, silicon nitride, boron nitride and titanium nitride.

Here, the honeycomb structured body 10 may be formed by using materials of two or more kinds, such as a composite body of silicon and silicon carbide, and aluminum titanate. In the case where the composite body of silicon and silicon carbide is used, silicon is desirably added to make up at least about 0% by weight and at most about 45% by weight of the entire body.

Here, the silicon carbide-based ceramic material refers to a material having a silicon carbide content of about 60% by weight or more.

Among those materials, oxide ceramics such as cordierite or aluminum titanate may be preferably used. This material cuts manufacturing costs, and has a comparatively low coefficient of thermal expansion so that, for example, breakage during use of the honeycomb structured body of the present invention as the honeycomb filter tends not to occur.

With respect to the honeycomb structured body 30, shown in FIG. 4, according to one embodiment of the second aspect of the present invention, the shape of the ceramic block 35 is a cylindrical shape; however, the ceramic block of the present invention is not limited to the cylindrical shape as long as it has a pillar shape, and any desired shape, such as an cylindroid shape and a rectangular pillar shape, may also be used.

The honeycomb structured body 30 according to one embodiment of the second aspect of the present invention is a honeycomb structured body configured with a catalyst supporting layer adhered thereto, and a catalyst supported on the catalyst supporting layer.

With respect to the catalyst, although not particularly limited, those which can reduce the activation energy for burning particulates or can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metals, an element, such as an alkali metal (Group 1 in Element Periodic Table), an alkali earth metal (Group 2 in Element Periodic Table), a rare-earth element (Group 3 in Element Periodic Table) and a transition metal element may be supported thereon.

Such honeycomb structured body 30 can convert CO, HC, and NOx and the like in exhaust gases.

By supporting a catalyst on the catalyst supporting layer of the honeycomb structured body 30, the honeycomb structured body 30 in which the catalyst is supported may become possible to function as a filter capable of capturing particulates in exhaust gases, and also function as a catalyst converter for converting CO, HC, NOx and the like contained in exhaust gases.

Moreover, when applying the catalyst to the ceramic block 35, it is desirable to apply the catalyst after the surface of the ceramic block 35 is coated with a catalyst supporting layer such as alumina, as described above. With this arrangement, the specific surface area is made greater so that the degree of dispersion of the catalyst is improved, and thus it becomes easier to increase the reaction sites of the catalyst. Since it becomes easier to prevent sintering of the catalyst metal by the catalyst supporting layer, the heat resistance of the catalyst is also likely to improve.

With respect to the catalyst supporting layer, oxide ceramics such as alumina, titania, zirconia, silica and ceria can be used.

Moreover, by supporting the catalyst on the catalyst supporting layer, oxidation reaction and the like progress on the catalyst, and reaction heat is generated, thereby it becomes easier to raise the temperature of the honeycomb structured body 30.

In the embodiments according to the second aspect of the present invention, supposing that the rate of the pore volume of pores having a pore diameter of 10 μm or less to the entire pore volume of the porous ceramic is $X_2$ (%), the porosity is $Y_2$ (%) and the weight of the catalyst supporting layer is $Z_2$ (g/l), these $X_2$, $Y_2$ and $Z_2$ are allowed to satisfy the following expressions (3) and (4):

$$X_2 \leq 20 - Z_2/10 \qquad (3), \text{ and}$$

$$Y_2 \geq 35 + 7Z_2/40 \qquad (4)$$

(where about $20 \leq Z_2 \leq$ about 150).

By adjusting the pore diameter and porosity of the porous ceramic in accordance with the amount of the catalyst supporting layer so as to satisfy the above-mentioned expressions (3) and (4), it becomes easier to provide a honeycomb structured body that can sufficiently exert functions such as a purifying function for exhaust gases, and also prevent an increase in the pressure loss.

In the case where $X_2$ is $(20-Z_2/10)$ or more, since the rate of the pore volume of pores having a pore diameter of 10 μm or less to the entire pore volume of the wall portion constituting the ceramic block 35 becomes less likely to be greater in comparison with the amount of adhesion of the catalyst supporting layer, the catalyst supporting layer becomes less likely to adhere to the pores, and thus the pressure loss tends not to increase.

Moreover, in the case where $Y_2$ is $(35+7Z_2/40)$ or more, since the volume of the pore itself becomes less likely to be small in comparison with the amount of adhesion of the catalyst supporting layer, the catalyst supporting layer becomes less likely to adhere to the pores and the volume of pores becomes less likely to decrease, and thus pressure loss tends not to increase.

Although not particularly limited, the lower limit of the porosity $Y_2$ of the ceramic block 35 is desirably set to about 38.5%, and the upper limit thereof is desirably set to about 75%. When the porosity is about 38.5% or more, the ceramic block 35 becomes less likely to cause clogging upon adhesion of the catalyst supporting layer thereto, and the pressure loss tends not to increase. In contrast, when the porosity is 75% or more, the ceramic block 35 does not tend to have a reduction in its strength and tends not to be easily broken.

More desirably, the lower limit of the porosity $Y_2$ of the ceramic block 35 is set to about 40%, and the upper limit thereof is set to about 65%.

The amount $(Z_2)$ of the catalyst supporting layer is set to at least about 20 g/l and at most about 150 g/l. By setting the amount of the catalyst supporting layer in this range, it becomes easier to favorably disperse the catalyst, and it becomes easier to prevent the increase in the pressure loss.

Moreover, with respect to the average pore diameter of the ceramic block 35, the lower limit value is desirably set to about 10 μm, and the upper limit value is desirably set to about 50 μm. The average pore diameter of about 10 μm or more is likely to cause adhesion of the catalyst supporting layer. In contrast, the average pore diameter of about 50 μm or less tends not to allow particulates to easily pass through the pores. Therefore, the honeycomb structured body can more easily capture particulates sufficiently and is likely to function as a filter without fail.

The above-mentioned porosity can be measured through known methods such as a mercury injection method, Archimedes method and a measuring method using a scanning electron microscope (SEM).

Moreover, in the ceramic block 35, with respect to the material for the plug, the thickness of cell walls, the material for the sealing material layer, the size and type of the cell, etc., those factors that are the same as those of the honeycomb structured body of the first aspect of the present invention may be used; therefore, detailed description thereof is omitted herein.

With the honeycomb structured body according to the embodiments of the second aspect of the present invention, since the relationship among the amount of the catalyst supporting layer, the pore diameter and the porosity of a porous ceramic material are specified as described above, by supporting a catalyst on the catalyst supporting layer, the honeycomb structured body according to the embodiments of the second aspect of the present invention can more easily exert catalyst functions sufficiently, and it becomes easier to prevent the increase in pressure loss after the addition of the catalyst.

The following description will discuss a manufacturing method according to the embodiments of the honeycomb structured body of the second aspect of the present invention.

First, an extrusion-molding process is carried out by using material paste mainly comprising the ceramic material as described above so that a cylindrical ceramic molded body to form a ceramic block is manufactured. Here, except that the shape of the molded body is a cylinder and that the dimension is larger in comparison with the embodiments according to the first aspect of the present invention, the same binder, dispersant and the like as those of the embodiments of the first aspect of the present invention are used and the molded body is formed by using the same method; therefore, detailed description thereof is omitted herein.

Next, in the same manner as the embodiments of the first aspect of the present invention, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug material paste, which forms plugs, is injected into the end portion on the outlet side of the inlet-side group of cells and the end portion on the inlet side of the outlet-side group of cells so that the cells are sealed.

Then, as in the embodiments of the first aspect of the present invention, the resulting product is degreased and fired to manufacture a ceramic block, a catalyst supporting layer is adhered to the wall portion, and catalyst is supported thereon.

EXAMPLES

The following description will discuss the present invention in detail by means of examples; however, the present invention is not intended to be limited by these examples.

Example 1

Powder of α-type silicon carbide having an average particle diameter of 22 μm (7000 parts by weight) and powder of α-type silicon carbide having an average particle diameter of 0.5 μm (3000 parts by weight) were wet-mixed, and to 10000 parts by weight of the resulting mixture were added 570 parts by weight of an organic binder (methyl cellulose) and 1770 parts by weight of water and kneaded to prepare a mixed composition.

Next, to the above-mentioned mixed composition were added 330 parts by weight of a plasticizer (trade name: Unilube, made by NOF Corp.) and 150 parts by weight of glycerin serving as a lubricant, followed by kneading, and then extrusion-molded to manufacture a raw molded body having a rectangular pillar shape as shown in FIG. 2.

After the above-mentioned raw molded body had been dried by using a microwave drier or the like to manufacture a ceramic dried body, predetermined cells were filled with a plug material paste-having the same composition as the raw molded body.

Next, after this had been again dried by using a drier, the resulting product was degreased at 400° C., and fired at 2200° C. in a normal-pressure argon atmosphere for 3 hours to manufacture a porous ceramic member 20 comprising a silicon carbide sintered body in which a porosity $Y_1$ was 42%; an average pore diameter was 11 μm; the rate of the pore volume $X_1$ of pores having a pore diameter of 10 μm or less to the entire pore volume was 13%; the size was 34.3 mm×34.3 mm×150 mm; the number of cells 21 was 28 cells/cm$^2$; and a thickness of substantially all the wall portions 23 was 0.30 mm.

By using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of porous ceramic members 20 were bonded to one another, and this was cut by using a diamond cutter so that a cylindrical-shaped ceramic block 15 was manufactured.

Next, 23.3% by weight of ceramic fibers made from alumina silicate (shot content: 3%, average fiber length: 100 μm) which served as inorganic fibers, 30.2% by weight of silicon carbide powder having an average particle diameter of 0.3 μm which served as inorganic particles, 7% by weight of silica sol (SiO$_2$ content in the sol: 30% by weight) which served as an inorganic binder, 0.5% by weight of carboxymethyl cellulose which served as an organic binder, and 39% by weight of water were mixed and kneaded to prepare a sealing material paste.

Next, a sealing material paste layer having a thickness of 0.2 mm was formed on the peripheral portion of the ceramic block 15 by using the above-mentioned sealing material paste. Further, this sealing material paste layer was dried at 120° C. so that a cylindrical-shaped aggregated honeycomb structured body 10 having a size of 143.8 mm in diameter× 150 mm in length was manufactured.

Next, γ-alumina was mixed with water and a nitric acid solution serving as a dispersant, and the resulting product was pulverized by using a ball mill under 90 min$^{-1}$ for 24 hours to prepare an alumina slurry having an average particle diameter of 2 μm, and the honeycomb structured body was immersed in the resulting slurry and, after having been taken out, dried at 200° C.

The above-mentioned processes were repeated until the alumina layer (catalyst supporting layer) had reached the amount of 20 g/L, and the resulting honeycomb structured body was fired at 600° C.

Next, diamine dinitro platinum nitric acid ([Pt(NH$_3$)$_2$(NO$_2$)$_2$]HNO$_3$) having a platinum concentration of 4.53% by weight was diluted with distilled water. The ceramic fired body on which the alumina layer containing a rare-earth oxide had been formed was immersed in the above-mentioned solution, heated at 110° C. for 2 hours, and further heated in a nitrogen atmosphere at 500° C. for one hour so that 5 g/L of a platinum catalyst having an average particle diameter of 2 nm was supported on the surface of the ceramic fired body, thereby completing the manufacturing process of the honeycomb structured body on which the catalyst was supported.

Examples 2 to 10, Comparative Examples 1 to 8

The same processes as those of Example 1 were carried out except that, in the process of forming a molded body, a mixed composition was formed by mixing respective components as shown in Table 1 and the molded body was manufactured by extrusion molding to manufacture a honeycomb structured body 10, and then a catalyst supporting layer of each the amount described in Table 2 was adhered to the resulting honeycomb structured body 10 so that a catalyst was supported thereon. Here, the amount of the platinum catalyst was set to a constant value, that is, 5 g/L.

Moreover, in Examples 3 to 10 and Comparative Examples 3 to 6, acrylic particles each having the average particle diameter described in Table 1 were added as a pore-forming agent used for forming pores.

TABLE 1

|  | SiC coarse powder | | SiC fine powder | | Acrylic powder | | Methyl cellulose (part by weight) | Water (part by weight) | Plasticizer (part by weight) | Lubricant (part by weight) |
|---|---|---|---|---|---|---|---|---|---|---|
|  | Particle diameter (μm) | Amount (part by weight) | Particle diameter (μm) | Amount (part by weight) | Particle diameter (μm) | Amount (part by weight) |  |  |  |  |
| Example 1 | 22 | 7000 | 0.5 | 3000 | Not added | | 570 | 1770 | 330 | 150 |
| Example 2 | 22 | 7000 | 0.5 | 3000 | Not added | | 570 | 1770 | 330 | 150 |
| Example 3 | 11 | 6720 | 0.5 | 2880 | 40 | 980 | 1050 | 2970 | 500 | 230 |
| Example 4 | 11 | 6720 | 0.5 | 2880 | 40 | 980 | 1050 | 2970 | 500 | 230 |
| Example 5 | 40 | 4550 | 0.5 | 1950 | 60 | 1060 | 550 | 1500 | 330 | 150 |
| Example 6 | 40 | 4550 | 0.5 | 1950 | 60 | 1060 | 550 | 1500 | 330 | 150 |
| Example 7 | 30 | 4550 | 0.5 | 1950 | 60 | 1060 | 550 | 1500 | 330 | 150 |
| Example 8 | 30 | 4550 | 0.5 | 1950 | 60 | 1060 | 550 | 1500 | 330 | 150 |
| Example 9 | 22 | 6720 | 0.5 | 2880 | 40 | 980 | 1050 | 2970 | 500 | 230 |
| Example 10 | 22 | 6720 | 0.5 | 2880 | 40 | 980 | 1050 | 2970 | 500 | 230 |
| Example 11 | 5/22 | 3500/3500 | 0.5 | 3000 | Not added | | 570 | 1770 | 330 | 150 |
| Comparative Example 1 | 11 | 7000 | 0.5 | 3000 | Not added | | 550 | 1800 | 330 | 150 |
| Comparative Example 2 | 22 | 7000 | 0.5 | 3000 | Not added | | 570 | 1770 | 330 | 150 |
| Comparative Example 3 | 11 | 6720 | 0.5 | 2880 | 40 | 980 | 1050 | 2970 | 500 | 230 |
| Comparative Example 4 | 40 | 4550 | 0.5 | 1950 | 60 | 1060 | 550 | 1500 | 330 | 150 |
| Comparative Example 5 | 30 | 4550 | 0.5 | 1950 | 60 | 1060 | 550 | 1500 | 330 | 150 |
| Comparative Example 6 | 30 | 4550 | 0.5 | 1950 | 60 | 1060 | 550 | 1500 | 330 | 150 |
| Comparative Example 7 | 50 | 7000 | 0.5 | 3000 | Not added | | 530 | 1770 | 330 | 150 |
| Comparative Example 8 | 5/22 | 3500/3500 | 0.5 | 3000 | Not added | | 570 | 1770 | 330 | 150 |

(Evaluation)

(1) Measurements of Porosity and the Like

Prior to forming a catalyst supporting layer and adhering a catalyst thereto, the pore distribution was measured in a range of pore diameters from 0.1 to 360 μm by using a porosimeter (AutoPore III9420, manufactured by Shimadzu Corporation) through a mercury injection method.

The rate $X_1$ (%) of the pore volume of pores having a pore diameter of 10 μm or less to the entire pore volume of the porous ceramic member 20 and the porosity $Y_1$ (%) obtained by the above-mentioned measurements, as well as the values of expressions (1) and (2) calculated based upon these values and the weight of the catalyst supporting layer $Z_1$ (g/l), are shown in Table 2.

(2) Measurements of Pressure Loss

Before and after forming a catalyst supporting layer and adhering a catalyst thereto, each of honeycomb structured bodies according to the examples and the comparative examples was installed in an exhaust passage of an engine, and by flowing air through it at a speed of 750 m³/hr, the pressure loss of the honeycomb structured body was measured. The results are shown in Table 2 and FIG. 5. In Table 2, the state before adhering the catalyst supporting layer and the like is referred to as "before coating", and the state after adhering the catalyst supporting layer and the like is referred to as "after coating".

mentioned expressions (1) and (2) has a pressure loss exceeding 13.0 kPa after the catalyst supporting layer has been adhered thereto. Consequently, since the pressure loss after coating becomes higher, it is difficult to apply the honeycomb structured body as a filter. In the examples and the comparative examples, the description has been made with respect to an aggregated honeycomb structured body according to one of the embodiments of the first aspect of the present invention. However, since an integral honeycomb structured body according to one embodiment of the second aspect of the present invention has the same structure as that of the aggregated honeycomb structured body except that the adhesive layers are not present in the integral honeycomb structured body, it shall be deemed that the integral honeycomb structured body should have the same results as those of the aggregated structured body obtained in the examples and the comparative examples.

What is claimed as new and desired to be secured by Letters Patent of the United States is:

1. A method of manufacturing a honeycomb structured body, comprising:

combining a plurality of porous ceramic members with one another through an adhesive layer to form a ceramic block, wherein each porous ceramic member has a plurality of cells placed parallel to each other in a longitudinal direction of the porous ceramic member with a wall portion therebetween and either end of the cell is sealed;

obtaining a first pore volume of pores in the porous ceramic member having a pore diameter of 10 μm or less;

obtaining an entire pore volume of the porous ceramic member;

obtaining a ratio $X_1$ (%) by dividing the first pore volume with the entire pore volume;

obtaining a porosity $Y_1$ (%) of the porous ceramic member;

TABLE 2

| | $X_1$ (%) | Average pore diameter (μm) | $Y_1$ (%) | $Z_1$ (g/l) | $20 - Z_1/10$ | $35 + 7Z_1/40$ | Pressure loss before coating (kPa) | Pressure loss after coating (kPa) |
|---|---|---|---|---|---|---|---|---|
| Example 1 | 13 | 11 | 42 | 20 | 18 | 38.5 | 12.6 | 12.7 |
| Example 2 | 13 | 11 | 42 | 40 | 16 | 42 | 12.6 | 12.8 |
| Example 3 | 7 | 19 | 58 | 80 | 12 | 49 | 12.5 | 12.6 |
| Example 4 | 7 | 19 | 58 | 120 | 8 | 56 | 12.5 | 12.7 |
| Example 5 | 11 | 18 | 57 | 40 | 16 | 42 | 12.4 | 12.6 |
| Example 6 | 11 | 18 | 57 | 80 | 12 | 49 | 12.4 | 12.7 |
| Example 7 | 2 | 20 | 52 | 40 | 16 | 42 | 12.5 | 12.5 |
| Example 8 | 2 | 20 | 52 | 80 | 12 | 49 | 12.5 | 12.6 |
| Example 9 | 3 | 21 | 62 | 120 | 8 | 56 | 12.4 | 12.7 |
| Example 10 | 3 | 21 | 62 | 150 | 5 | 61.25 | 12.4 | 12.8 |
| Example 11 | 17 | 11 | 45 | 20 | 18 | 38.5 | 12.7 | 12.8 |
| Comparative Example 1 | 89 | 9 | 42 | 20 | 18 | 38.5 | 12.6 | 13.3 |
| Comparative Example 2 | 13 | 11 | 42 | 80 | 12 | 49 | 12.6 | 15 |
| Comparative Example 3 | 7 | 19 | 58 | 150 | 5 | 61.25 | 12.5 | 13.6 |
| Comparative Example 4 | 11 | 18 | 57 | 120 | 8 | 56 | 12.4 | 13.5 |
| Comparative Example 5 | 2 | 20 | 52 | 120 | 8 | 56 | 12.5 | 13.6 |
| Comparative Example 6 | 2 | 20 | 52 | 150 | 5 | 61.25 | 12.5 | 14.8 |
| Comparative Example 7 | 16 | 11 | 37 | 20 | 18 | 38.5 | 12.8 | 13.4 |
| Comparative Example 8 | 17 | 11 | 45 | 40 | 16 | 42 | 12.7 | 13.6 |

Figure 5:
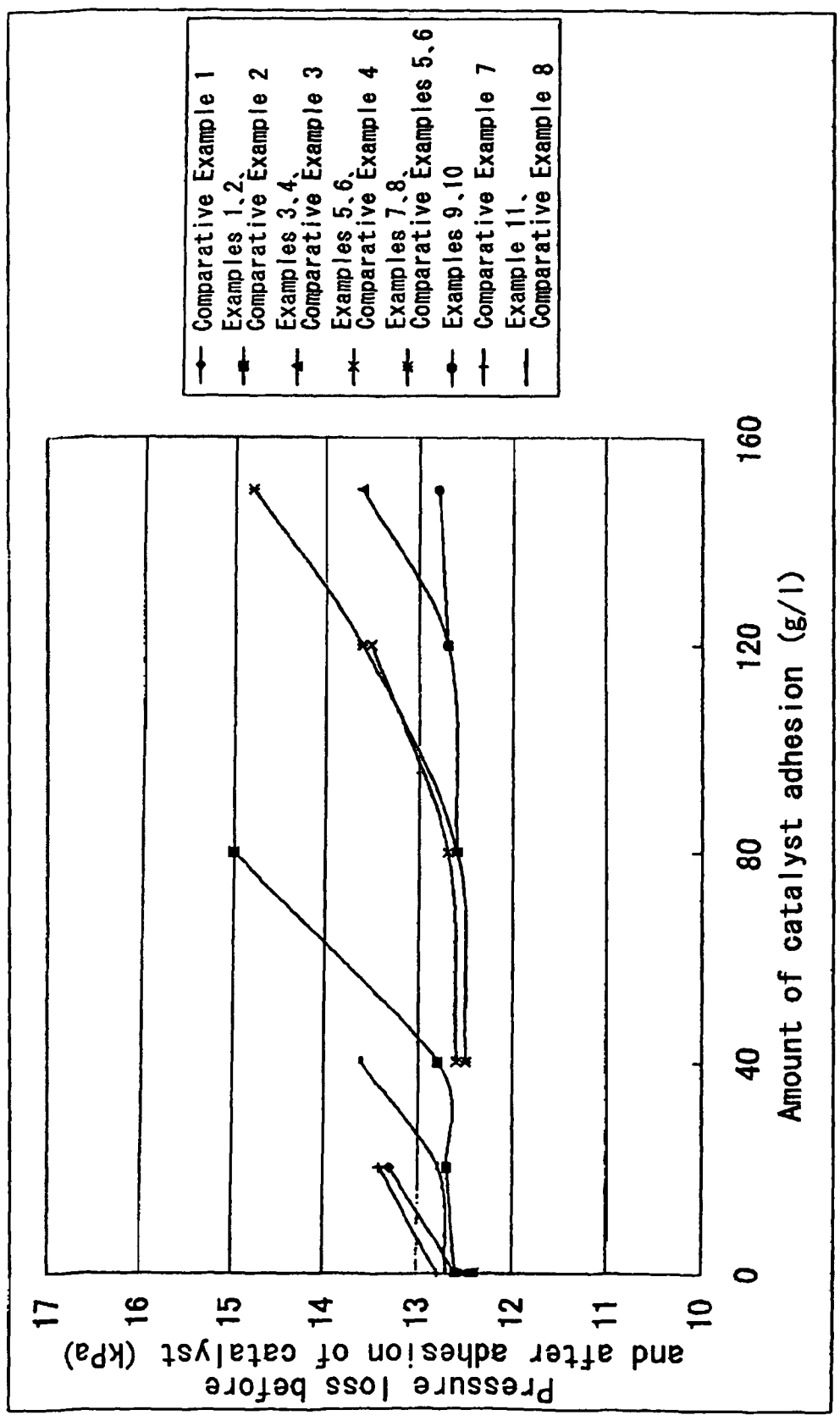
FIG. 5 is a graph that shows results relating to the examples and the comparative examples.

As shown in Table 2 and FIG. 5, each of the aggregated honeycomb structured bodies according to the examples that satisfies the relationships of the above-mentioned expressions (1) and (2) has little change in the pressure loss before and after adhering the catalyst supporting layer thereto, and even after the adhesion of the catalyst supporting layer, the value of the pressure loss is maintained within a range of 12.5 to 13.0 kPa, which is a low value. In contrast, each of the honeycomb structured bodies according to the comparative examples that does not satisfy the relationships of the above-applying a catalyst supporting layer on the porous ceramic member at a weight of $Z_1$ (g/l), wherein the values of $X_1$, $Y_1$, and $Z_1$ satisfy the following expressions:

$$X_1 \leqq 20 - Z_1/10,$$

$$Y_1 \geqq 35 + 7Z_1/40, \text{ and}$$

about $20 \leqq Z_1 \leqq$ about 150.

2. The method according to claim 1, wherein the porosity of the porous ceramic member is at least about 38.5% and at most about 75%.

3. The method according to claim 2, wherein the porosity of the porous ceramic member is in the range of about 40% to about 65%.

4. The method according to claim 1, wherein an average pore diameter of the honeycomb structured body is at least about 10 μm and at most about 50 μm.

5. The method according to claim 1, wherein the catalyst supporting layer comprises an element selected from the group consisting of alumina, titania, zirconia, silica, and ceria.

6. The method according to claim 1, further comprising applying a catalyst on the catalyst supporting layer, wherein the catalyst comprising an element chosen from platinum, palladium, rhodium, an alkali metal, an alkali earth metal, a rare-earth element, and a transition metal element.

7. The method according to claim 1, wherein the honeycomb structured body comprises a silicon carbide-based ceramic or a composite material of silicon and silicon carbide.

8. The method according to claim 1, wherein the honeycomb structured body produced using said method is used as an exhaust gas purifying device for vehicles.

* * * * *